United States Patent [19]
Winter et al.

[11] 3,786,682
[45] Jan. 22, 1974

[54] CATALYST SAMPLING APPARATUS

[75] Inventors: George R. Winter, Des Plaines;
Laurence O. Stine, Western Springs;
John E. Vande Ven, Bensenville, all of Ill.

[73] Assignee: Universal Oil Products Company, Des Plaines, Ill.

[22] Filed: Dec. 22, 1972

[21] Appl. No.: 317,870

[52] U.S. Cl. ............................................. 73/421 B
[51] Int. Cl. ............................................. G01n 1/14
[58] Field of Search ........ 73/421 A, 421 B; 222/148

[56] References Cited
UNITED STATES PATENTS
3,487,695   1/1970   Hunschild .................. 73/421 B

*Primary Examiner*—S. Clement Swisher
*Attorney, Agent, or Firm*—James R. Hoatson, Jr.; Robert W. Erickson; William H Page, II

[57] ABSTRACT

Catalyst is withdrawn from an operating high pressure reactor through a tube extending into the catalyst bed from a blocked off sample receiver. The large diameter tube contains a small diameter line which delivers a gas stream of such high velocity that it acts as a valve to prevent catalyst from entering the opening in the larger tube. A temporary reduction in the gas flow allows catalyst to fall into the large tube, through which it falls by gravity to the receiver. The end of the gas line is preferably near the opening in the catalyst withdrawal tube.

8 Claims, 1 Drawing Figure

PATENTED JAN 22 1974 3,786,682
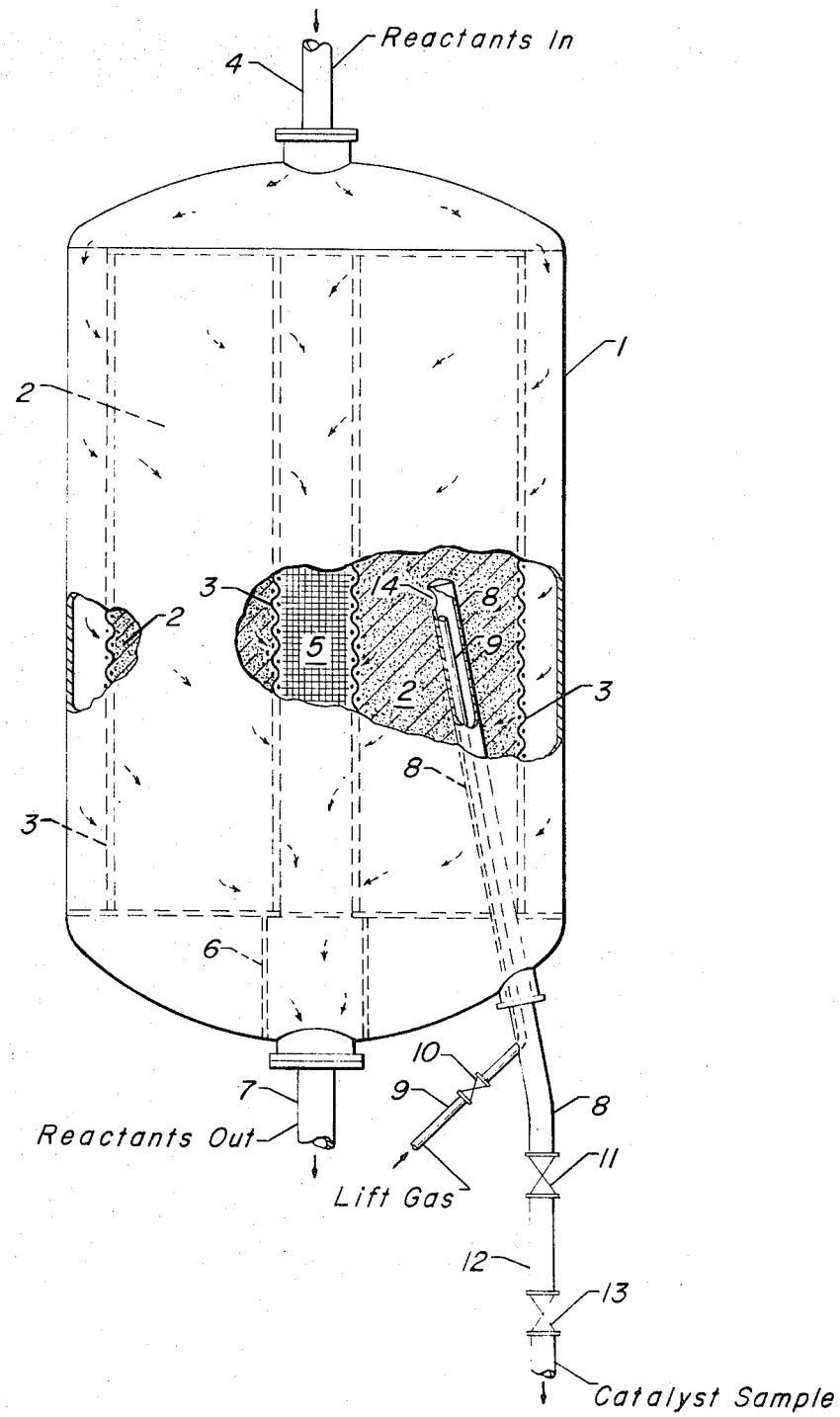

3,786,682

CATALYST SAMPLING APPARATUS

BACKGROUND OF THE INVENTION

1. Field of the Invention

The invention relates to the field of measuring and testing. It is directly related to solid material samplers such as used to withdraw catalyst from operating high pressure reactors.

2. Description of the Prior Art

One section of the prior art uses a rotating sleeve to open and close openings in the end of catalyst withdrawal tubes as shown by U. S. Pat. No. 3,348,419 (Cl 73-424). A second type of sampler is represented by U. S. Pat. No. 3,653,265 (Cl 73-421), in which the pressure within the reactor is allowed to force catalyst to flow out of the reactor and into a receiver. The latter patent discloses the connection of a purge line to the catalyst withdrawal tube, with the purge line operating only immediately after a sample has been taken, and then supplying sufficient gas to prevent the upward escape of catalyst by raising the pressure within the withdrawal tube above that within the reactor. In the present invention, gas does not flow out of the withdrawal tube and through the sampler.

BRIEF SUMMARY OF THE INVENTION

A high velocity gas stream may be used as a valve to control the withdrawal of catalyst samples from an operating high pressure reactor. The gas stream is delivered by a small line contained within the withdrawal tube to a point near the end of the tube, and is temporarily reduced to allow a small amount of catalyst to fall counter to the gas flow and into the withdrawal tube.

DESCRIPTION OF THE DRAWING

The invention is illustrated in the preferred embodiment of withdrawing samples from an operating high pressure hydrocarbon reactor vessel 1. This vessel is shown used as a radial flow reactor containing an annular bed 2 of solid catalyst particles confined between catalyst retention screens 3. Reactants are shown as entering the vessel on the top through inlet 4, being distributed over the catalyst bed in the space between the inner wall of the vessel and the outer catalyst retention screen, and then passing through the catalyst and into the centerpipe volume 5. The reactants flow downward past some internal supports 6 and out of the vessel through outlet 7. The basic elements of the subject apparatus include a catalyst withdrawal tube 8 and the support gas inlet line 9 contained within it. The catalyst withdrawal tube extends from a point inside the catalyst bed at which it is desired to obtain samples, through the wall of the vessel, and out to a sample receiver arrangement. This conduit may be of any shape and material, but must have sufficient mechanical strength to withstand high pressures and temperatures. The internal end of the catalyst withdrawal tube has an opening 14 shown here on the side, but this opening may be the unsealed end of the tube and face upward or some other direction. A valve means 11 is attached to the outer end of the withdrawal tube to provide a means of sealing this end when the sample receiver 12 is depressurized or purged by gases entering through lines not shown. The catalyst is withdrawn for analysis through valve 13.

Support gas inlet line 9 carries a high pressure stream of recycle gas at a rate controlled by valve 10. This gas stream is of such a high flow rate that its passage out of opening 14 prevents any catalyst particles from entering the withdrawal tube. When this gas flow is reduced, or possibly stopped, some catalyst will fall into the opening in the withdrawal tube. Once the particles fall past the upper end of the support gas line, the particles will continue to descend after the gas stream returns to its original high rate because no gas is flowing in the lower section of the tube, and the catalyst will accumulate above valve 11. Valve 11 would normally be closed while the support gas stream is reduced, but may be opened to utilize the pressure inside the reactor to push the catalyst into the receiver. The end of the support gas line is preferably close to the opening in the catalyst withdrawal tube. It is only necessary for a small amount of catalyst to enter the tube when a sample is taken.

This description and drawing of a particular embodiment are intended to quickly impart an understanding of the principle of the present invention, and their simplicity is for the purposes of clarity and ease of understanding. No limitation as to the scope of the present invention is intended. Modifications apparent to those skilled in the relevant arts are therefore included with the scope of this writing.

DETAILED DESCRIPTION OF THE INVENTION

There are many situations in which there is great utility in being able to sample solid particles contained in a storage vessel or reactor. Some examples of this are the sampling of grains stored within an elevator, sampling of particles of cement or other aggregate used in the construction industries, sampling of solid catalyst particles being manufactured or regenerated, or the withdrawal of catalyst samples from a reactor in use. In processes for the catalytic conversion of hydrocarbons by contacting the hydrocarbon feed stock with a fixed bed of catalyst maintained at conversion conditions, as typified by reforming, hydrodesulfurization or paraffin isomerization, it is often desired to determine the condition of the catalyst. An important reason for this is to gain a better knowledge of the mechanisms of the deactivation which is occurring to the catalyst. This evaluation would examine coke content, metal deposition, changes in the porous structure or surface characteristics of the catalyst, and measurements of the loss of a specific constituent of the catalyst, such as a volatile halogen.

The present invention is useful as an apparatus for removing small quantities of catalyst from within an operating hydrocarbon conversion reactor, and has the advantage of requiring no moving mechanical parts within the reactor to seal the opening in the catalyst withdrawal tube. The invention in a preferred embodiment consists of a catalyst withdrawal tube approximately 2 inches in diameter which extends upward into the bed of catalyst and passes through the wall of the reactor at some point at its side or bottom, and a smaller support gas line of about ¾ inch diameter contained within the catalyst withdrawal tube. The catalyst withdrawal tube has an opening on its upper end which allows catalyst to fall into the catalyst withdrawal tube and thereby pass out of the reactor. Instead of the mechanical valves or ports common in the prior art, the present invention uses a high velocity stream of gas supplied by the small support gas inlet line to prevent catalyst from entering the catalyst withdrawal tube at any time except when it is desired to take a sample. The invention therefore eliminates any difficulty with mechanical apparatus which must be forced to move or rotate under high temperature and pressure differentials, and which require a troublesome mechanical seal to prevent the escape of high pressure reactants at the point where the moving part passes through the reactor wall.

As shown in the drawing, a second preferred embodiment has the opening in the catalyst withdrawal tube located on the side of the tube rather than on top, and this opening may be of a different cross-sectional area than the tube. The embodiment is depicted in a fixed bed, radial flow reactor, in which there is no catalyst movement. It is becoming increasingly common to use moving bed reactors, especially in such processes as reforming. If the present invention is used in such a moving bed reactor, it is preferred that it rise vertically from the bottom of the reactor, to avoid large stresses being placed upon it by the movement of the descending catalyst. If mounted vertically, the forces on the tube would be mainly compressive, and the tube would be able to withstand them more readily than the bending stress which would be present if the tube was mounted on the side of the vessel.

Sampling procedure consists of interrupting or decreasing the flow of the support gas passing through the small diameter line for a short time period sufficient to allow some catalyst to fall below the end of the small line. The original gas flow rate is then resumed and continued until the next sample is taken. Catalyst which has fallen past the top of the small line is no longer subjected to any upward flowing gas stream and therefore continues to descend through the catalyst withdrawal tube. Normally, a catalyst receiver or lock hopper would be attached to the outer end of the catalyst withdrawal tubes, and some valve means 11 would separate the tube to allow depressurization or removal of the catalyst receiver without the passage of high pressure gases from the reactor. Since the catalyst would normally be very hot and coated with flammable hydrocarbons, means should be provided for passing a purge gas such as nitrogen or hydrogen over the catalyst to cool it and allow its safe withdrawal. Valve 11 may be left open when the catalyst sample is withdrawn and closed only when it is desired to depressurize the catalyst receiver.

There is also a valve means required on the outer end of the support gas line to control the gas flow rate. This valve should be capable of providing rapid changes in the gas flow so that the amount of catalyst which passes through the opening may be controlled. The optimum length of the sampling period would be set by experience as it depends on the catalyst's shape and ability to flow while in contact with the reactants. The specific gas used to support the catalyst is not a limitation on the invention, and the gas may be the recycle gas of a hydrocarbon conversion process as indicated on the drawing, or recycled flue gas if the apparatus is used in a regenerator, or a stream of hydrogen or nitrogen as the situation may dictate.

To obtain a representative sample of the catalyst bed, catalyst should not be held in the withdrawal tube between sampling periods. When the gas flow is returned to its high rate, any catalyst contained within the catalyst withdrawal tube between the upper end of the support gas line and the opening in the withdrawal tube will become trapped within the withdrawal tube. Catalyst trapped within the tube is not in contact with the reactants, and therefore would contaminate any samples taken unless the sampling procedure is repeated to flush this trapped catalyst from the tube. Catalyst is difficult to blow out of the tube and back into the reactor. It would have to be pushed into the solid mass of catalyst in the reactor by physically displacing this catalyst, which is compressed by the entire bed above it. Therefore, it is preferred that the opening of the support gas line be close to the opening in the catalyst withdrawal tube to prevent large amounts of catalyst from entering the tube when a sample is taken. As the end of the gas support line is moved further away from the opening in the catalyst withdrawal tube, the amount of catalyst trapped in the tube increases. This is because catalyst must be allowed to enter the withdrawal tube until the sample has passed below the end of the gas support line, and the further the catalyst must fall to reach this point the longer the gas supply must be reduced. With the end of the support gas line moved to a point outside the reactor, the situation would be reached where between 10 to 15 pounds of catalyst would be trapped every time a sample was taken.

Although shown and described as tubular, both the catalyst withdrawal tube and the support gas line may be conduits of any shape and material. The manner of construction and the placement of the inner line within the catalyst withdrawal tube is not specific to this invention and other configurations besides that shown in the drawing are readily apparent. The particular type of valve used on either conduit is also nonspecific to the invention, and the valve may be a gate valve, a ball valve, a sliding plate, or any other suitable flow restricting means. The valve means on the support gas line of course would have to be capable of producing quick changes in the gas flow rate. The valve means on the catalyst withdrawal tube must be capable of allowing the passage of the withdrawn catalyst into the receiving vessel while also providing a positive seal when the catalyst receiver is depressurized. The valve means may in fact consist of two or more valves located on separate lines or in series.

The catalyst withdrawal tube may be curved to pass around obstructions and reach any point within the catalyst bed. It is preferred that the catalyst withdrawal tube be at all points of a sufficient slope to allow the catalyst to freely flow to the catalyst receiver. This is not a strict requirement however, because by opening valve 11 and 13 a sufficient gas flow could be produced in the withdrawal tube to force the catalyst to flow.

We claim as our invention:

1. A sampling apparatus for withdrawing solid particles from a bed of the particles contained in a vessel, which apparatus comprises:

a. a particle withdrawal tube which extends from a point outside the vessel to a point within the vessel at which it is desired to take samples, said particle withdrawal tube having an opening which allows the entrance of the particles into the tube;

b. a valve means located on the outer end of the particle withdrawal tube, said valve means being capable of preventing the escape of gas when closed, and of allowing the free flow of the particles when open;

c. a support gas inlet line, said gas line being at least partially contained within the particle withdrawal tube and having an opening located within the particle withdrawal tube to thereby allow gas to flow from the gas line into the particle withdrawal tube and then out of the opening in the particle withdrawal tube and into the vessel;

d. a valve means located on the support gas line, said valve means used to regulate the flow of gas into the line and to reduce the gas flow when it is desired to take samples, the flow at other times being at such a high rate that particles are prevented by the escaping gas from entering the opening in the particle withdrawal line.

2. The apparatus of claim 1 wherein the support gas inlet line is contained within the particle withdrawal tube for at least the distance that the particle withdrawal tube extends into the vessel.

3. A sampling apparatus for withdrawing quantities of solid catalyst from a pressurized reactor, which apparatus comprises:

a. a catalyst withdrawal tube which extends from a point outside the reactor to a point within the reactor at which it is desired to take samples, said catalyst withdrawal tube having an opening which allows the entrance of the particles into the tube;

b. a valve means located on the outer end of the catalyst withdrawal tube, said valve means being capable of preventing the escape of gas when closed, and of allowing the free flow of the particles when open;

c. a support gas inlet line, said gas line being at least partially contained within the catalyst withdrawal tube and having an opening located within the particle withdrawal tube to allow gas to flow from the gas line into the catalyst withdrawal tube, and then out of the opening in the catalyst withdrawal tube into the reactor;

d. a valve means located on the support gas line, said valve means used to regulate the flow of pressurized gas into the line and to reduce the gas flow when it is desired to take samples, the flow at other times being at such a high rate that particles are prevented by the escaping gas from entering the opening in the particle withdrawal line.

4. The apparatus of claim 3 wherein the support gas inlet line is contained within the catalyst withdrawal tube for at least the distance that the catalyst withdrawal tube extends into the vessel.

5. The apparatus of claim 3 wherein the support gas inlet line carries a recycle gas stream.

6. The apparatus of claim 3 wherein the opening in the catalyst withdrawal tube is at the end of the tube.

7. The apparatus of claim 3 wherein the opening in the catalyst withdrawal tube is on the side of the tube.

8. The apparatus of claim 3 wherein the catalyst withdrawal tube is mounted substantially vertically.

* * * * *